United States Patent
Spindler et al.

(10) Patent No.: US 12,290,420 B2
(45) Date of Patent: May 6, 2025

(54) ASSEMBLY INTERFACE BETWEEN A SUPERSTRUCTURE AND AN IMPLANT BODY

(71) Applicant: Bruno Spindler, Oppenau (DE)

(72) Inventors: Bruno Spindler, Oppenau (DE);
Clemens Kimmig, Oppenau (DE);
Bennjamin Wölfle, Lauf (DE); Timo Reuter, Bruchsal (DE)

(73) Assignee: Bruno Spindler, Oppenau (DE)

( * ) Notice: Subject to any disclaimer, the term of this patent is extended or adjusted under 35 U.S.C. 154(b) by 545 days.

(21) Appl. No.: 17/593,168

(22) PCT Filed: Mar. 11, 2020

(86) PCT No.: PCT/DE2020/000049
§ 371 (c)(1),
(2) Date: Sep. 10, 2021

(87) PCT Pub. No.: WO2020/182243
PCT Pub. Date: Sep. 17, 2020

(65) Prior Publication Data
US 2022/0183798 A1    Jun. 16, 2022

(30) Foreign Application Priority Data
Mar. 12, 2019 (DE) .................. 10 2019 001 715.3

(51) Int. Cl.
*A61C 8/00* (2006.01)
(52) U.S. Cl.
CPC ................................ *A61C 8/0068* (2013.01)

(58) Field of Classification Search
CPC .................. A61C 8/0068; A61C 8/0048–0078
See application file for complete search history.

(56) References Cited

U.S. PATENT DOCUMENTS

| 6,227,859 | B1 * | 5/2001 | Sutter | A61C 8/005 |
| | | | | 433/173 |
| 6,672,871 | B2 | 1/2004 | Hurson | |
| 10,548,692 | B2 * | 2/2020 | Baruc | A61C 8/006 |

(Continued)

FOREIGN PATENT DOCUMENTS

| CN | 101146491 B | 4/2013 |
| CN | 203609529 U | 5/2014 |

(Continued)

*Primary Examiner* — Edward Moran
(74) *Attorney, Agent, or Firm* — Smartpat PLC (57) ABSTRACT

The disclosure relates to an assembly including a superstructure support that supports a superstructure, an implant body having an inner thread, and a threaded bolt. The superstructure support and the implant body are secured against rotation relative to one other. An inner thread is arranged in the cavity of the superstructure support, in the region of said cavity facing the implant body. The threaded bolt has two outer threads arranged one behind the other, with or without a spacing between them, the first of which is an outer thread for driving and the second is an outer thread for clamping. The two outer threads have different pitches. The present invention improves an assembly interface between a superstructure support and an implant body, such that the superstructure is securely supported, with simple pre-assembly and final assembly.

8 Claims, 7 Drawing Sheets

(56) References Cited

U.S. PATENT DOCUMENTS

| | | | |
|---|---|---|---|
| 11,166,752 B2 * | 11/2021 | Bjorn | H04R 25/606 |
| 2008/0233538 A1 | 9/2008 | Hug et al. | |
| 2010/0304329 A1 * | 12/2010 | Heo | A61C 8/0089 |
| | | | 433/152 |
| 2011/0123949 A1 | 5/2011 | Wolf et al. | |
| 2016/0206408 A1 | 7/2016 | Spindler et al. | |
| 2017/0231726 A1 | 8/2017 | Baruc | |
| 2019/0223986 A1 | 7/2019 | Buurlage et al. | |
| 2019/0298498 A1 | 10/2019 | Spindler | |
| 2020/0093578 A1 | 3/2020 | Spindler | |
| 2024/0307156 A1 * | 9/2024 | Fischler | A61C 8/0068 |

FOREIGN PATENT DOCUMENTS

| | | |
|---|---|---|
| CN | 105451682 B | 4/2019 |
| DE | 10101907 A1 | 7/2002 |
| DE | 202008016697 U1 | 3/2009 |
| DE | 202012102746 U1 | 8/2012 |
| EP | 1972297 B1 | 9/2008 |
| WO | 9852488 A1 | 11/1998 |
| WO | 2018029650 A1 | 2/2018 |

\* cited by examiner

Fig. 16

ASSEMBLY INTERFACE BETWEEN A SUPERSTRUCTURE AND AN IMPLANT BODY

TECHNICAL FIELD

The disclosure generally relates to dental implantology, and more specifically to an assembly interface between a superstructure support that supports a superstructure, and an implant body having an inner thread, achieved with the aid of a threaded bolt.

BACKGROUND

In dental implantology, among other things, an endosseous implant body is often used to support the prosthesis as part of the fabrication of a single-tooth replacement. In this case, the implant body, a type of screw dowel, is screwed into an artificially created bore in the patient's jaw. The screwed-in implant body accommodates an implant post in the finished prosthesis. The latter is secured against rotation in the implant body with a special clamping device. A superstructure forming the visible tooth crown is placed directly or indirectly on the implant post, for example bonding.

DE 20 2012 102 746 U1 discloses a dental implant post system with which an implant body, a superstructure support, an adhesive body and an artificial crown form an artificial denture.

SUMMARY

The present disclosure provides an improved assembly interface between a superstructure support and an implant body, such that the superstructure is securely supported, with simple pre-assembly and final assembly.

The superstructure support supports a superstructure. The implant body has an inner thread and cooperates with a threaded bolt. The superstructure support and the implant body have a coupling geometry that is complementary at least in certain regions in order to ensure the rotational stability of the assembly interface. The superstructure support has a cavity open towards the superstructure and towards the implant body.

An inner thread is arranged in the cavity of the superstructure support, in the region of said cavity facing the implant body. The threaded bolt has two outer threads arranged one behind the other, with or without a spacing between them, the first of which is an outer thread for driving and the second is an outer thread for clamping. The two outer threads have different pitches. The outer thread for driving fits into the inner thread for driving of the cavity of the superstructure support, while the outer thread for clamping fits into the inner thread for clamping of the implant body.

The disclosure provides an assembly interface that connects a superstructure support to an implant body using a double helical gear unit. For this purpose, both the superstructure support and the implant body each have their own inner thread. Both inner threads mesh with two different outer threads of a threaded bolt.

In a pre-assembly step, the threaded bolt is securely arranged in the inner thread incorporated in the lower end of the superstructure support by screwing in or screwing through. For connection to the implant body, the superstructure support is inserted into the implant body together with the threaded bolt. Thereby, the free end of the threaded bolt is positioned in front of the inner thread of the implant body. With the aid of a tool, which is coupled through a cavity of the structure support into a tool cavity of the threaded bolt, the threaded bolt is set into a rotational movement, such that, on the one hand, the front threaded bolt thread screws into the implant body thread and, on the other hand, the superstructure support and the implant body move translationally towards each other. Thus, the threaded bolt permanently braces the superstructure support and the implant body against each other.

The threads connecting the three parts involved in the assembly interface are single-thread and/or multi-thread. For screwing or unscrewing the threaded bolt—into or out of the implant body—its radial outer contour has no tool engagement surface. This limitation does not apply to any radial contour of an axial bore or otherwise designed axial cavity.

The threaded bolt, which unlike a regular screw does not have a screw head, does not have to be inserted through the opening of the superstructure support into the cavity of the superstructure that is closest to the superstructure. Consequently, such cavity can have a cross-section along its entire length, which is smaller than the cross-section of a regular screw head. Thus, using such assembly interface without changing the size of the superstructure support increases its dimensional rigidity.

DETAILED DESCRIPTION

Figure 1:
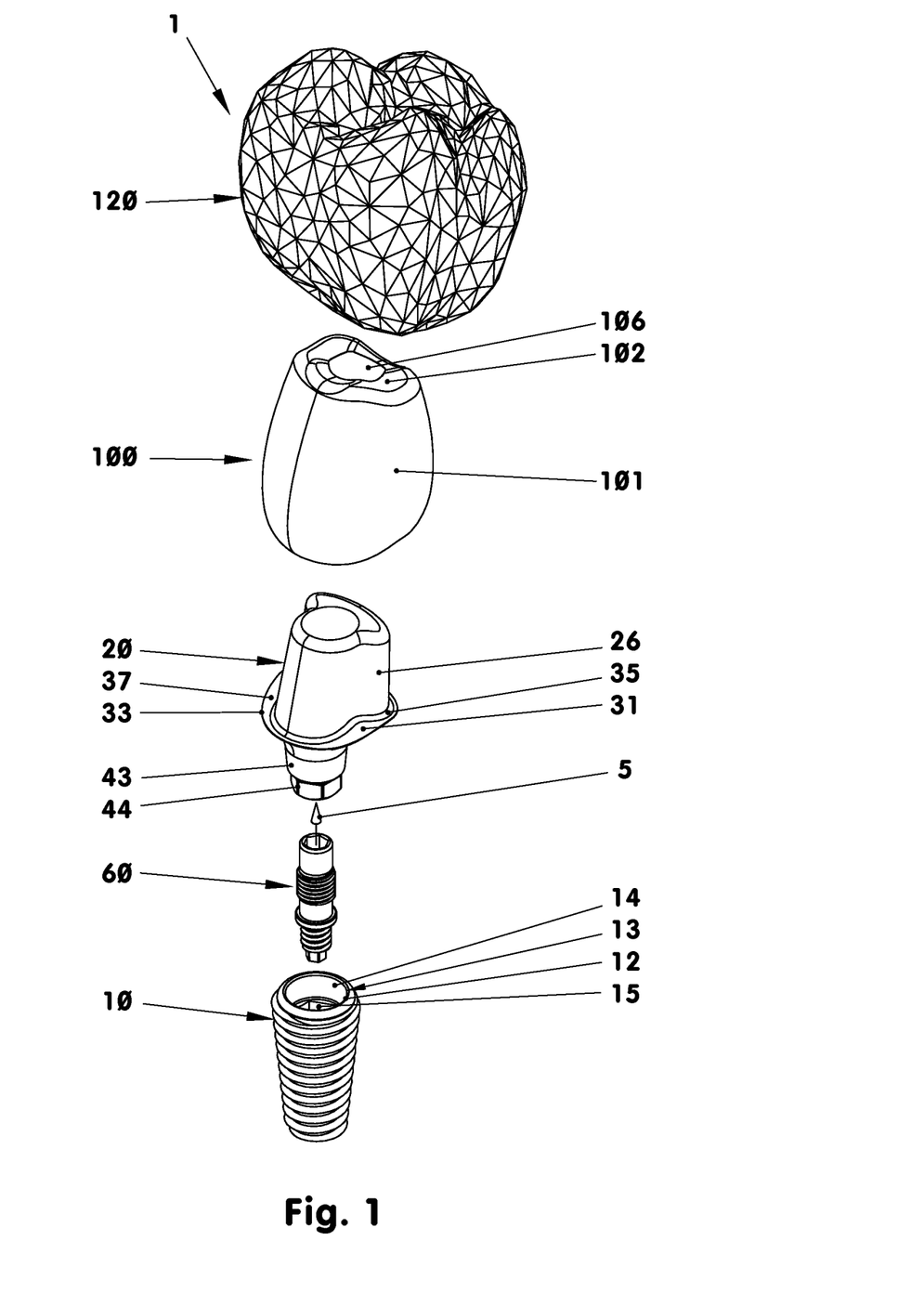
FIG. 1: Exploded model of a prosthetic denture.

FIG. 1 shows an example of all parts of an artificial tooth (1) in the form of an exploded view. A hollow screw-like implant body (10) serves as the base. It is used to position and screw a superstructure support (20) in a manner secured against rotation, in combination with an adhesive body (100), which may be bonded thereon, by means of a special threaded bolt (60).

For this purpose, the superstructure support (20), for example an angled superstructure support, is seated in the implant body (10) in a conical seat (14). The superstructure support (20) is held in a cavity (13) of the implant body (10) by means of the threaded bolt (60). An artificial tooth crown (120) is usually placed and bonded onto the adhesive body (100) as a further superstructure component.

The base of the prosthetic denture (1) is an implant body (10) that can be screwed into the jawbone. It is a hollow bolt with a possibly self-tapping, for example non-metric outer thread. Approximately in the upper half, the implant body (10) has the multi-level cavity (13), which is divided into three zones, see FIG. 2. The first zone (14), which is located in the region of the implant shoulder (12) of the implant body (10), is an inner cone having a cone angle of, for example, 18 angular degrees. The inner cone (14) merges into an inner hexagon (15) of the second zone, which serves as an anti-rotation device. Instead of the inner hexagon (15), a double inner hexagon or another positive-locking or force-fitting anti-rotation geometry can also be used as the coupling geometry. The third zone (17) is a threaded bore with an inner thread for clamping (82) that receives the threaded bolt (60) holding the superstructure support (20) upon assembly. The right-side inner thread for clamping (82) is, for example, an M 1.6×0.35 thread according to DIN 13, sheet 1.

The primary function of the superstructure support (20) —seated in the implant body (10)—is to serve as a base for the artificial tooth crown (120). It has a region facing the implant body (10) and a region facing the tooth crown (120) or the superstructure, as the case may be.

The region facing the implant body (10) is the implant neck (42) with its outer cone (43) and outer hexagon (44). The outer cone (43) and the outer hexagon (44) fit precisely in the cavity (13) of the implant body (10). In the axial direction facing the tip of the implant body (10), the end faces of the outer hexagon (44) do not contact the cavity (13).

Above the implant neck (42), an implant plate (31) is connected, which emerges from the implant neck (42), for example with a continuous transition. The implant plate (31), for example non-circular implant plate, has, at least in regions or sections, the shape of the shell of a truncated cone, the cone angle of which opens towards the tooth crown (120). For example, the cone angle is between 125 and 131 angular degrees. If necessary, the lower side of the implant plate (31) also consists of several truncated cones protruding from one another, each enclosing a different angle relative to the center line (29). In this case, the cone angles are between 120 and 136 angular degrees.

The outer edge (33) of the implant plate (31) here has a spacing to the center line (29) that changes steadily in certain regions upon a 360° rotation around the center line (29), for example between 2.22 and 3.48 mm. The edge (33) thereby has a height offset of, for example, 0.8±0.2 mm in the longitudinal direction of the center line (29).

The implant post (23) extends above the implant plate (31). The latter has a cross-section in the transition region, for example rounded transition region, to the implant plate (31), which is smaller than the maximum cross-section of the implant plate (31). Thus, the implant plate (31) also has a flat upper edge surface (37) towards the implant post (23). In almost every sectional plane passing through the center line (29), the contour of the flat upper edge surface is oriented perpendicular to the center line (29), at least in certain regions. At the narrowest point, the implant plate (31) protrudes, for example 0.4 to 0.5 mm, in the radial direction. The widest part can measure more than, for example, 2 mm. The flat upper edge surface (37) forms, among other things, a seating surface for the adhesive body (100) or the tooth crown (120).

The rounded transition region can also be deepened by 0.05 to 0.2 mm in the axial direction, parallel to the center line (29), such that a groove (35) is created between the flat upper edge surface (37) and the implant post (23). According to the section shown in FIG. 2, the implant post (23) tapers upward.

According to FIG. 1, the implant post (23) consists, in a first approximation, of a superposition of an oblique truncated cone with a circular base cross-section and an oblique truncated cone with an elliptical cross-section penetrating it in certain regions. The center lines of the two truncated cones form a plane, in which the small half-axes of the elliptical cross-section lie. In the region of the penetration of the two oblique truncated cones, there are fillets whose radii are, for example, between 0.3 and 0.4 mm. This special shape of the implant post (23) results in an anti-rotation base for the adhesive body (100) to be supported.

The superstructure support (20) may be equipped with a titanium nitride coating at least above the implant plate (31). Its layer thickness is, for example, 1 to 4 μm. Alternatively, thin-walled ceramic or copolymer coatings can be applied there.

According to FIG. 1, the superstructure support (20) has a continuous cavity (51), which has a kink in the central region with a kink angle of, for example, 11±4 angular degrees. The finished cavity (51) consists of four zones.

The first zone (52) and the second zone (53) serve the purpose of inserting the threaded bolt (60). The first, lower zone (52) is a cylindrical bore, whose diameter is, for example, 2.1 mm at a depth of approximately 1.9 mm. Its center line (49) coincides with the center line (29). It is followed by a second zone (53), for example a right-side inner thread (72), which is designated M 2×0.25 according to DIN 13, sheet 2. Such fine thread here has a length of, for example, 2 mm. The transition between the inner thread (72) and the bore (52) is formed by a flat stop collar (54).

The fourth, upper zone (57) is likewise a cylindrical bore. Its center line (59) intersects the center line (29) in the third zone (56), for example at an angle of 11 angular degrees. The upper zone (57) is used to insert the tool, which is used to tighten the threaded bolt (60). The third zone (56) represents a transition region that has, for example, the shell surface of a hemisphere, see FIG. 2.

The threaded bolt (60-62) is usually divided into five regions. These are, lined up from front to back, an articulation region (63), a drive region (70), an intermediate region (75), a clamping region (80) and a gripping region (85), see FIGS. 3, 6 and 9.

The articulation region (63) is a cylindrical journal (64), in which a tool cavity (65) is machined. It has a length of, for example, 1.5 mm with a diameter of, for example, 1.66 mm. According to FIGS. 3, 6 and 9, its central tool cavity (65) is an inner hexagon (66) with a width across flats of, for example, 1.13 mm, whose depth usable by the tool is, for example, 1.05 mm. Instead of the inner hexagon, a hexalobular socket, an internal polygon, a cross slot, a slot or the like can also be provided. Another drive variant is a hexalobular head or outer hexagon. If necessary, the hexalobular or hexagonal shapes are rounded off in a barrel shape in the axial direction.

Figures 3, 5:
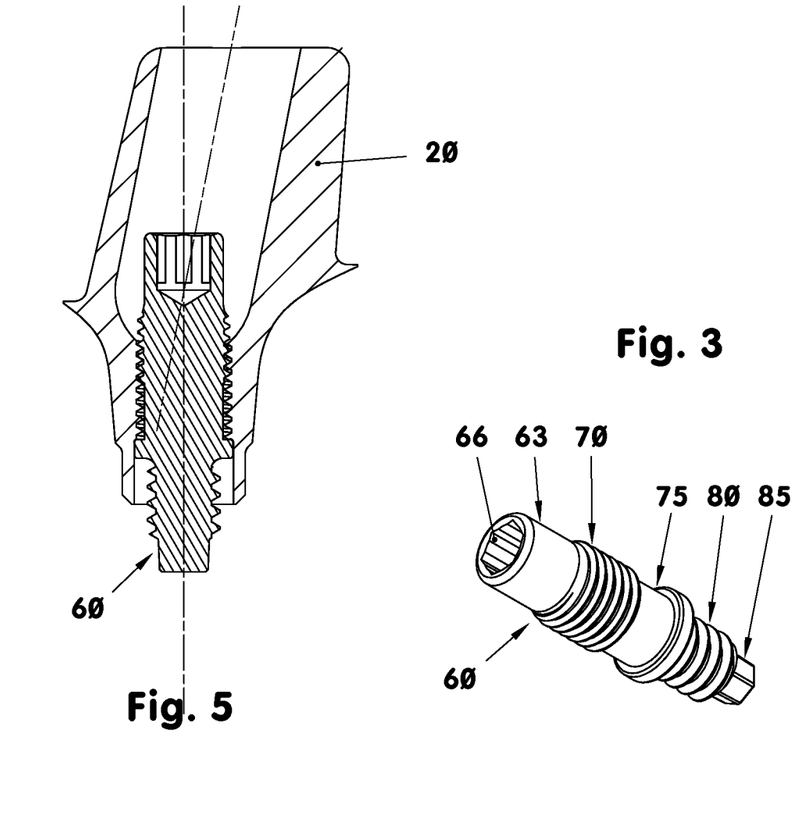
FIG. 3: Perspective view of the threaded bolt.
FIG. 5: Same as FIG. 4, but after screwing in the threaded bolt.
Figures 6, 7, 8:
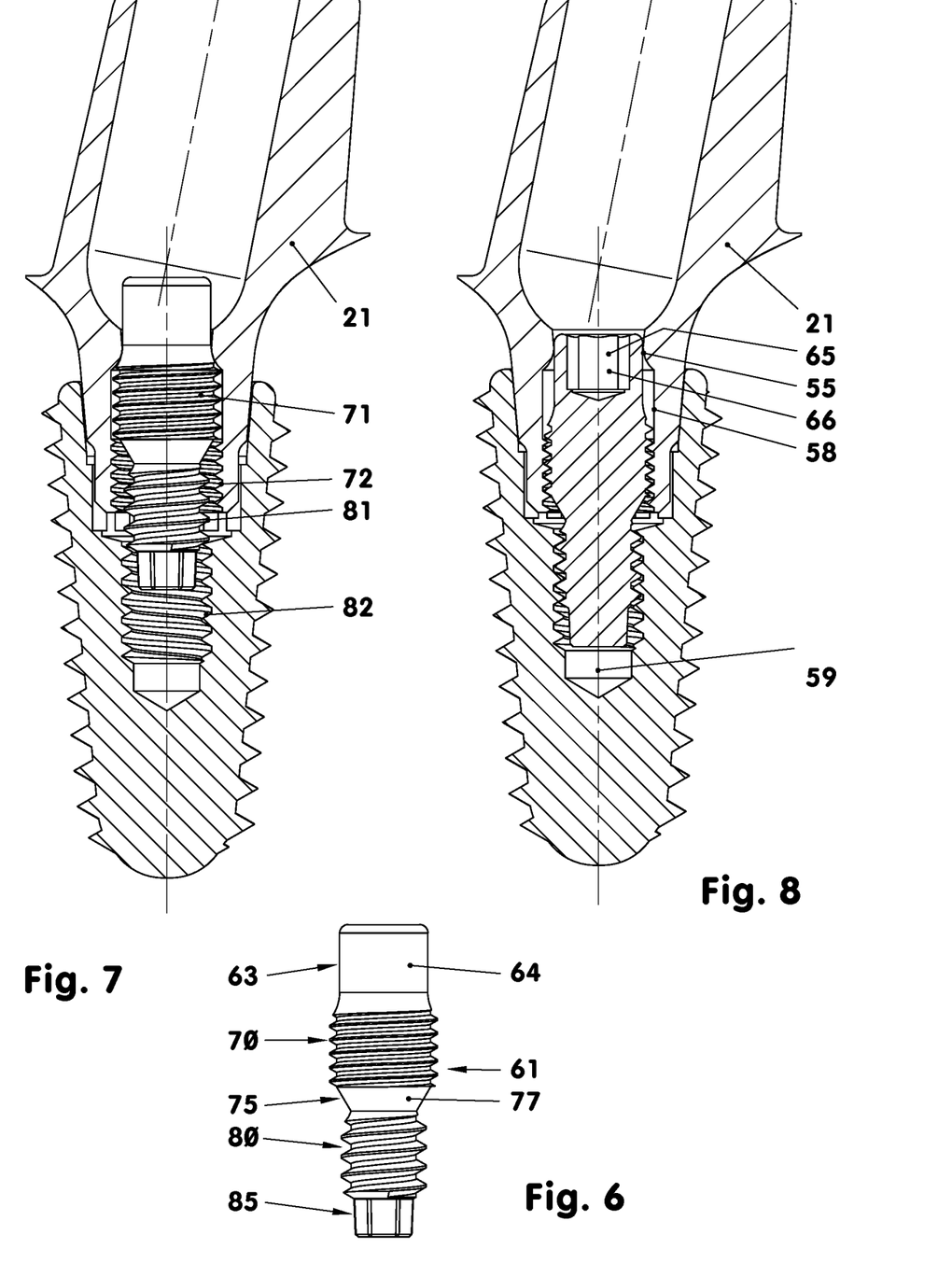
FIG. 6: Side view of a short threaded bolt.
FIG. 7: Longitudinal section through the superstructure support and implant body with the threaded bolt loosely inserted.
FIG. 8: Same as FIG. 7, but after attaching the superstructure support.
Figure 9:
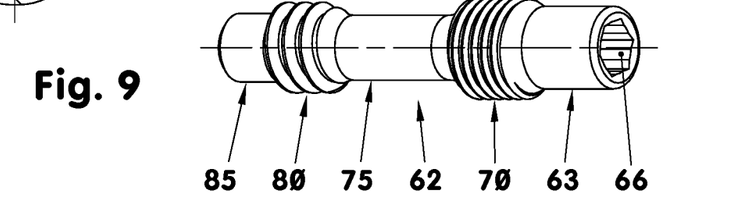
FIG. 9: Perspective view of a screw bolt with counter-rotating outer threads.

With the threaded bolt (60-62) of FIGS. 3, 6, and 9, the tool cavity (65) can be incorporated into the drive region (70) —while shortening or omitting the journal (64) —thereby shortening the threaded bolt (60-62) by, for example, 1.5 mm or more.

According to FIGS. 3 and 6, the drive region (70) has a fine thread of the M 2×0.25 type, the usable length of which is, for example, 1.73 mm. Fine threads other than drive threads (71, 72), such as M 1.8×0.25, M 1.8×0.2, M 1.6× 0.25 or M 1.6×0.2, are also conceivable. For these, the outer diameter of the drive region (70) must be adjusted accordingly in each case.

Figure 2:
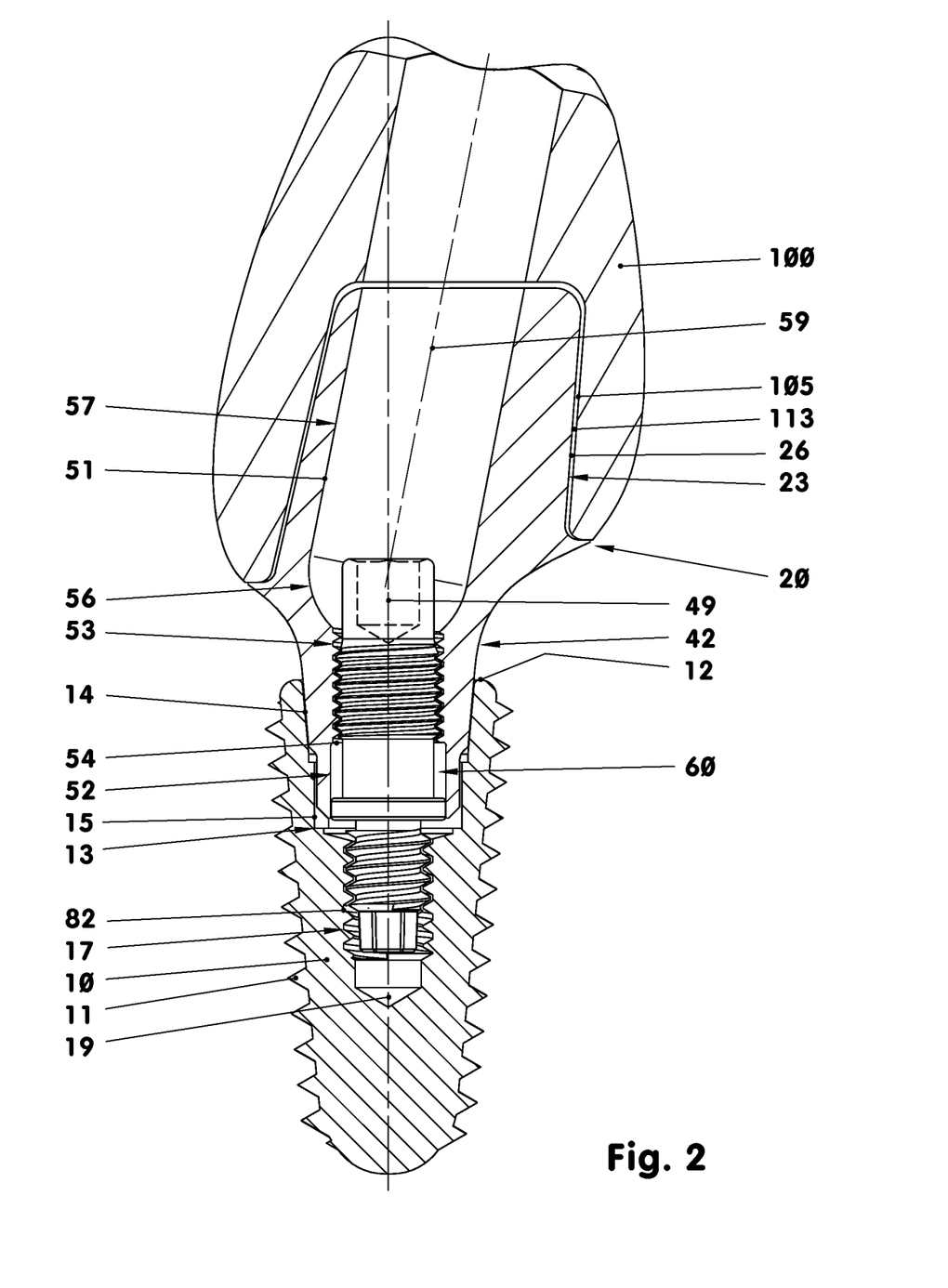
FIG. 2: Longitudinal section through a prosthetic denture without a dental crown.

The intermediate region (75) adjoining the drive region (70) serves as a spacer to the subsequent clamping region (80). The intermediate region (75), according to FIG. 2, is composed of a cylinder journal (76) and a stop flange (78). The cylinder journal (76) may have the same outer diameter as the articulation region (63). If necessary, the outer diameter of the cylinder journal (76) corresponds to the core diameter of the outer thread for driving (71). The length of the intermediate region (75) amounts to, for example, 1.03 mm.

Towards the clamping region (80), a disk-shaped stop flange (78) adjoins the cylinder journal (76). The stop flange (78) has a wall thickness of, for example, 0.46 mm with an outer diameter of, for example, 2.08 mm.

The clamping region (80) represents an outer thread for clamping (81). This is a 1.46 mm long M1.6×0.35 standard thread according to DIN 13, sheet 1.

Figure 4:
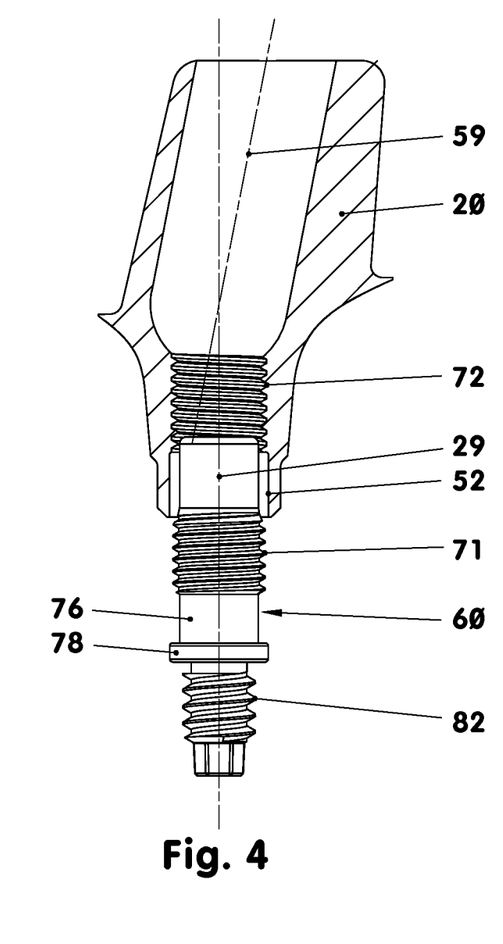
FIG. 4: Longitudinal section through the superstructure support upon the insertion of the threaded bolt.

On the one hand, the gripping region (85) adjacent to the clamping region (80) has a geometric shape via which the threaded bolt (60-62) can be gripped with the aid of a handling device and inserted into the fourth zone (57) of the cavity (51) of the superstructure support (20-22) for screwing in, see FIG. 4. On the other hand, the gripping region (85) facilitates the insertion of the superstructure support (20-22) with a screwed-in threaded bolt (60), see FIG. 5, into the stepped bore of the implant body (10).

Here, for example, the gripping region (85) is an outer hexagon tapered towards the free end of the threaded bolt (60). Two opposite flanks of the outer hexagon of such gripping means enclose, for example, an angle of 5 angular degrees. The maximum diameter of the outer diameter is smaller than the core diameter of the outer thread for clamping (81). According to FIG. 3, the outer hexagon has a width across flats of 0.95 mm.

Of course, the gripping region (85) can also be designed as a short cylindrical journal or cone. If a cone is used, it tapers towards its free end. Preferably, the journal or the cone have a maximum outer diameter that is smaller than or equal to the core diameter of the outer thread for clamping. If necessary, the gripping region (85) can be omitted. In such a case, the threaded bolt (60) for insertion and screwing into the superstructure support (20) is gripped by the handling device at the outer thread for clamping (81).

The gripping region (85) can be integrated into the clamping region (80) in the form of a bore or cavity, either in whole or in certain regions. In such a case, the handling device engages in the corresponding bore or cavity with a miniature mandrel.

FIG. 4 shows the superstructure support (20) upon insertion of the threaded bolt (60) into the lower cavity (53). Here, the articulation region (63) of the threaded bolt (60) enters the region of the inner thread for driving (72). If the threaded bolt (60) is pushed further into the lower cavity (52), the outer thread for driving (71) arrives in front of the inner thread for driving (72) of the superstructure support (20). From here, the threaded bolt (60) is screwed into the inner thread for driving (72) until the stop flange (78) of the threaded bolt (60) rests against the stop collar (54), see FIG. 5. The threaded bolt (60) is now securely seated in its rear position in the superstructure support (20). In this form, the combination of the superstructure support (20) and the threaded bolt (60) can be marketed.

The process by which the superstructure support (20) is inserted and screwed into the implant body (10) is described below with reference to FIGS. 12-15 with their simplified views. A double helical gear unit, with two right-side threads in half-sided sectional view, is shown in four positions. In each of FIGS. 12-15, a threaded bolt equivalent (260), a lifting nut (220) as a superstructure support equivalent and a fixed nut (210) as an implant body equivalent are shown.

The threaded bolt equivalent (260) has, in a first approximation, all the features of a threaded bolt according to DIN 2509. A threaded section is located on both sides of, for example, a smooth shaft (275). The front thread section here is the clamping thread (81), while the rear thread section is the drive thread (71). On the drive thread (71), it has a tool cavity in the form of a slot (267), in order to be able to turn the threaded bolt equivalent (260) with a slotted screwdriver, for example.

The clamping thread (81) and the drive thread (71) each have four threads in the exemplary embodiment. One thread corresponds to one thread tooth rotating by 360 angular degrees. The clamping thread (81) has a pitch of 7 LE, while the drive thread (71) has a thread pitch of only 5 LE.

Both the lifting nut (220) and the fixed nut (210) have four threads each. The thread pitch of the lifting nut (220) corresponds to the thread pitch of the drive thread (71). Here, the thread pitch of the fixed nut (210) corresponds to that of the clamping thread (81).

The fixed nut (210) has a fixed nut stop (212) on its upper end face. An anti-rotation bar (215) projects over the fixed nut stop (212).

The lifting nut (220) has a lifting nut stop (222) on its lower end face, which is opposite the fixed nut stop (212). An anti-rotation groove (225) is arranged in its outer wall. The anti-rotation bar (215) of the fixed nut (210) projects into the latter. The anti-rotation bar (215) corresponds to the inner hexagon (15) of the implant body (10). The anti-rotation groove (225) is similar to the outer hexagon (44) of the superstructure support (20).

Figure 12:
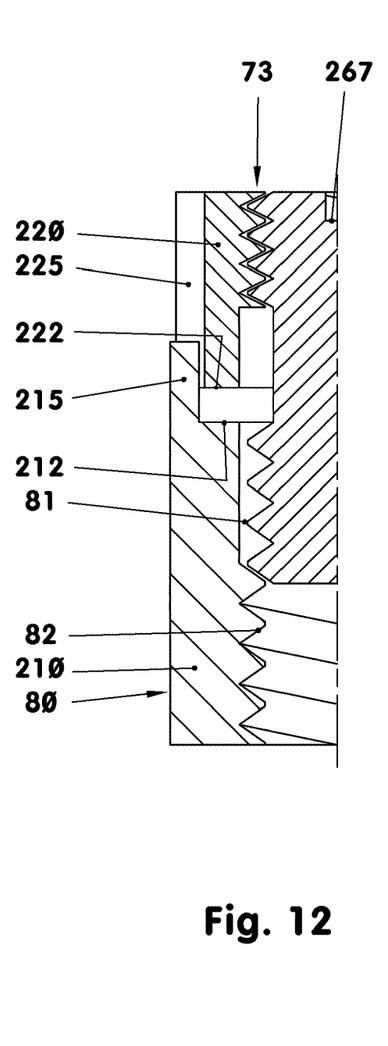
FIG. 12: Simplified view of the double helical gear unit with two right-side threads in half-sided sectional view before screwing in the threaded bolt equivalent.

FIG. 12 shows the assembly consisting of the lifting nut (220) and the threaded bolt equivalent (260) immediately after insertion into the fixed nut (210). The anti-rotation groove (225) of the lifting nut (220) engages around the anti-rotation bar (215) of the fixed nut (210). The foremost flank of the front thread of the outer thread for clamping (81) comes into contact with the rear flank of the inner thread for clamping (82). The lifting nut stop (222) assumes its maximum spacing of 6 LE after contact has been made with respect to the fixed nut stop (212).

Figure 13:
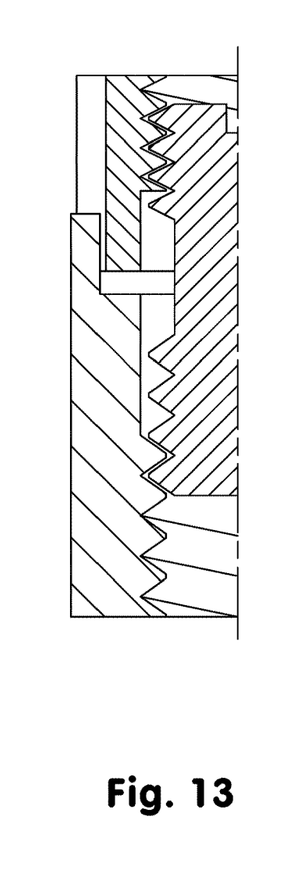
FIG. 13: Same as FIG. 12, but the threaded bolt equivalent has been screwed in by one turn.

Then, the threaded bolt equivalent (260) is screwed into the fixed nut (210) by means of a 360° clockwise rotation, see FIG. 13. The threaded bolt equivalent (260) thereby makes a stroke of 7 LE. The 360° clockwise rotation of the threaded bolt equivalent (260) forces it out of the lifting nut (220) by one turn. Thereby, the threaded bolt equivalent (260) leaves the lifting nut (220) behind by 5 LE. Nevertheless, the lifting nut (220) —in a clamping stroke—moves towards the fixed nut (210) by 2 LE, wherein the spacing between the lifting nut stop (222) and the fixed nut stop (212) is reduced by 2 LE to 4 LE. The clamping stroke "H" follows the following formula in this exemplary embodiment:

$$H=U*(p_S-p_A)$$

Therein, "U" is the number of turns of the threaded bolt equivalent (260), "$p_S$" is the pitch of the clamping thread (81, 82) and "$p_A$" is the pitch of the drive thread (71, 72).

Figure 14:
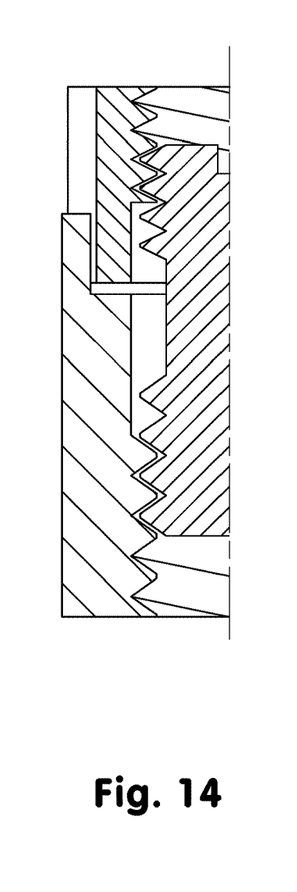
FIG. 14: Same as FIG. 13, but the threaded bolt equivalent has been screwed in by one additional turn.

If the threaded bolt equivalent (260) is screwed in one turn lower, the sectional view shown in FIG. 14 arises.

The spacing between the lifting nut stop (222) and the fixed nut stop (212) has decreased to 2 LE.

Figure 15:
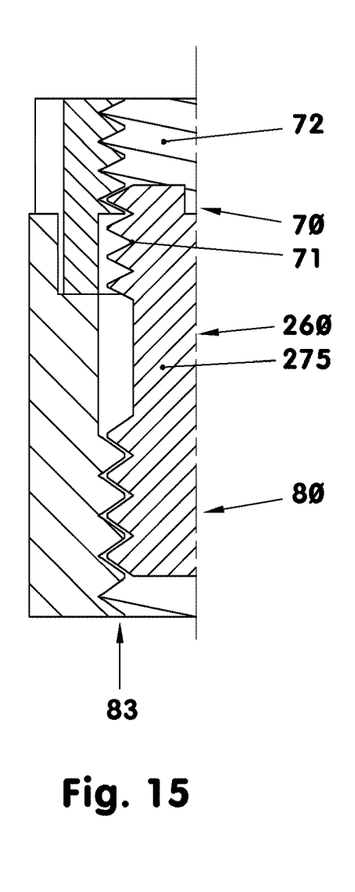
FIG. 15: Same as FIG. 14, but the threaded bolt equivalent has been screwed in by one last turn.

After a further turn of the threaded bolt equivalent (260), the lifting nut stop (222) is in contact with the fixed nut stop (212), see FIG. 15. The screwing-in movement of the threaded bolt equivalent (260) is completed.

The number of threads per thread pairing (73, 83) is only selected as an example in the principle representation shown—to clarify the function. Since both thread pairings (73, 83) hold the same clamping load when the lifting nut (220) is screwed tight, the number of supporting threads per thread pairing varies only slightly.

In accordance with FIG. 2, the screw-in procedure is completed after the implant cone (43) is firmly seated in the inner cone (14) of the implant body (10). All four threads of the outer thread for clamping (81) are seated in the inner thread for clamping (82). Likewise, the six threads of the outer thread for driving (71) are located in the inner thread for driving (72).

FIG. 6 shows a short threaded bolt (61) without a stop flange. Its drive thread (71) and clamping thread (81) correspond to those of the threaded bolt (60) of FIG. 3. Between the two threads (71, 81) there is an intermediate region (75), for example a 0.45 mm short truncated cone journal (77), which tapers towards the clamping thread (81). For example, its cone angle amounts to 60 angular degrees.

The superstructure support (21) matching such threaded bolt (61), see FIGS. 7 and 8, has a cavity (51) of a different design than the cavity of the superstructure support (21) according to FIG. 2.

The first lower zone (52) is, for example, a right-side M 2×0.25 inner thread for driving (72) according to DIN 13, sheet 2. Such fine thread here has a length of, for example, 1.33 mm. Its core diameter amounts to, for example, 1.76 mm. Adjacent to the inner thread for driving (72) as a second zone (53) is a cylindrical rear grip bore (58), the diameter of which is, for example, 2.02 mm at a depth of approximately 1.25 mm. The bore (58) merges into a stop zone in the form of a constriction (55) that—in longitudinal section—widens with a 0.5 mm radius in the direction of the rear grip bore (58). The constriction (55) has an inside diameter of, for example, 1.62 mm, such that the cylinder journal (64) of the threaded bolt (61) fits through it with little clearance. Above the constriction (55), the bore widens out in a funnel shape, wherein the opening angle measures at least 10 angular degrees. The center lines of the inner thread for driving (72), the rear grip bore (58) and the constriction (55) coincide with the center line (29).

As shown in FIG. 7, prior to the attachment of the superstructure support (21) to the implant body (10), the threaded bolt (61) is screwed into the superstructure support (21) from below to such an extent that its outer thread for driving (71) leaves the inner thread for driving (72) again, in order to enter the rear grip bore (58). The outer thread for driving (71) of the threaded bolt (61) is seated in the rear grip bore (58) in a manner secured against rotation and nevertheless can rotate freely with clearance.

If the superstructure support (21) is now inserted into the implant body (10) together with the threaded bolt (61), the foremost thread of the outer thread for clamping (81) comes into contact with the first thread of the inner thread for clamping (82), see FIG. 7.

FIG. 8 shows the assembly interface after attaching the superstructure support (21) to the implant body (10). The two outer threads (71, 81) have been engaged into their corresponding inner threads (72, 82) almost simultaneously upon the screwing-in process. The cylinder journal (64) of the threaded bolt (61) closes the constriction (55) with a small amount of clearance, such that neither cement nor adhesive can arrive in the region of the drive thread (71, 72) there upon the further finishing of the prosthetic single-tooth replacement.

Figure 10:
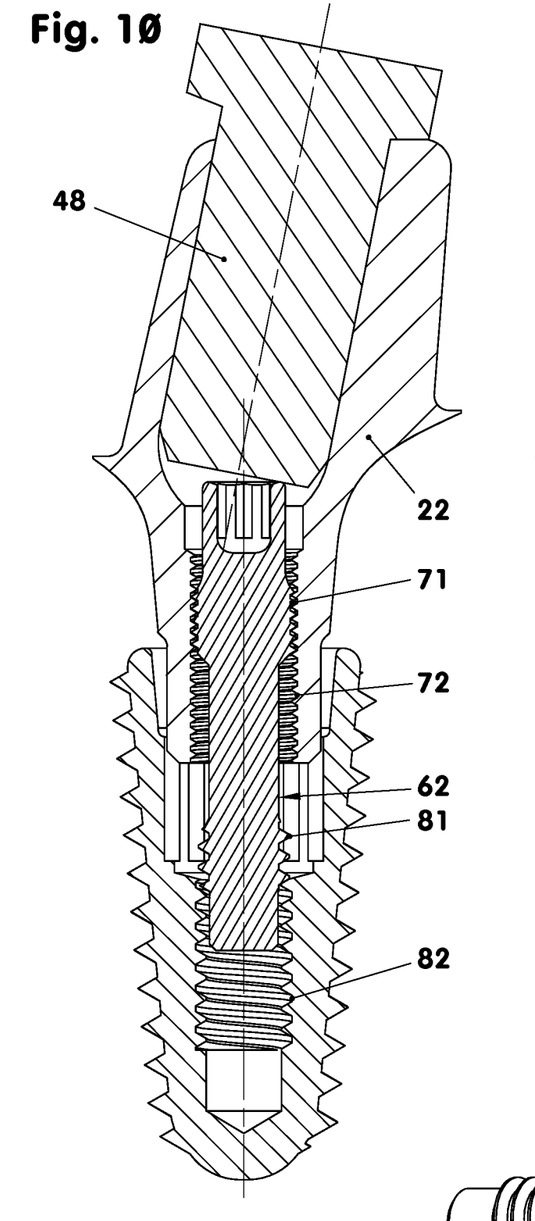
FIG. 10: Longitudinal section through the superstructure support with a screwed-in threaded bolt upon insertion into the implant body.
Figure 11:
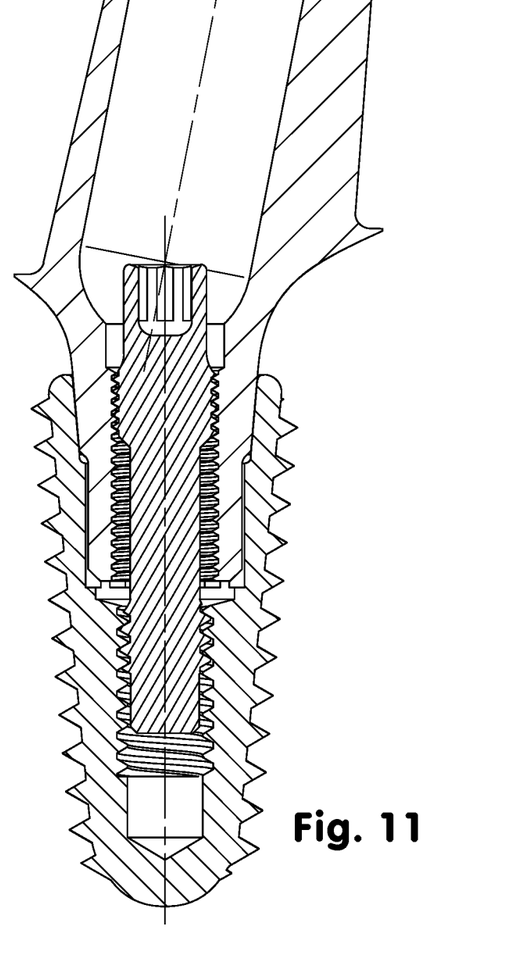
FIG. 11: Same as FIG. 10, but after attaching the superstructure support.

FIGS. 9-11 show an assembly interface with a threaded bolt equivalent (262), which has both right-side (81) and left-side (71) threads. For this purpose, FIGS. 16-19 show a simplified view of the double helical gear unit in half-sided partial sectional view in four positions. In these FIGS., the threaded bolt equivalent (262) has a right-side clamping thread (81) with four threads at the front and a left-side drive thread (71) with seven threads at the rear. The mathematical amount of both thread pitches is identical for both thread pairings (73, 83), for example. The threaded bolt equivalent (262) is shown in side view.

The lifting nut (220) is also secured against rotation relative to the fixed nut (210) in FIGS. 16-19. The anti-rotation device (215, 225), the lifting nut stop (222) and the fixed nut stop (212) are almost identical to the variant shown in FIGS. 12-15.

Figure 16:
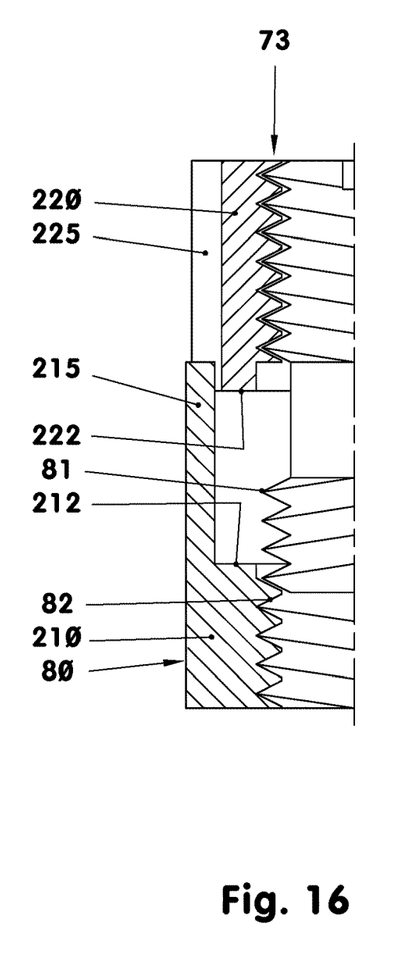
FIG. 16: Simplified view of the double helical gear unit with two right-side threads in half-sided sectional view before screwing in the threaded bolt equivalent.

According to FIG. 16, all three parts of the combination of lifting nut (220), threaded bolt equivalent (262) and fixed nut (210) are in their initial state after insertion of the threaded bolt equivalent (262) into the fixed nut (210). Here as well, the thread flank merging into the front end face of the screw-in bolt (262) is in contact with the rear thread flank of the rear thread of the inner thread for clamping (82).

Figure 17:
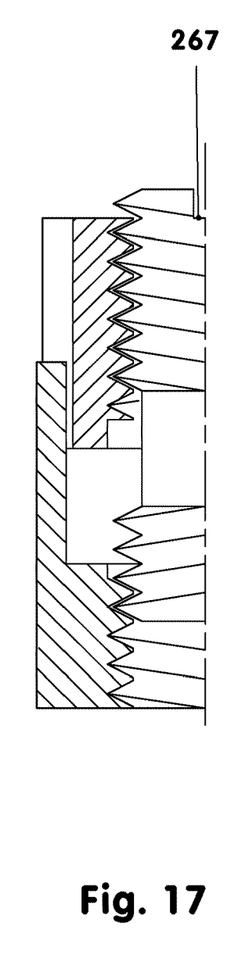
FIG. 17: Same as FIG. 16, but the threaded bolt equivalent has been screwed in by one turn.

If the threaded bolt equivalent (262) is now rotated clockwise through 360 angular degrees, its first thread—here, for example, by 5 LE—screws into the fixed nut (210), see FIG. 17. At the same time, the lifting nut (220), which is secured against rotation on the fixed nut (210), also shifts by one thread turn—that is, also by, for example, 5 LE—in the direction of the lifting nut (220). Consequently, the lifting nut stop (222) moves 10 LE toward the fixed nut stop (212). With this exemplary embodiment, the clamping stroke H follows the following formula:

$$H=U*(p_S+p_A)$$

Figure 18:
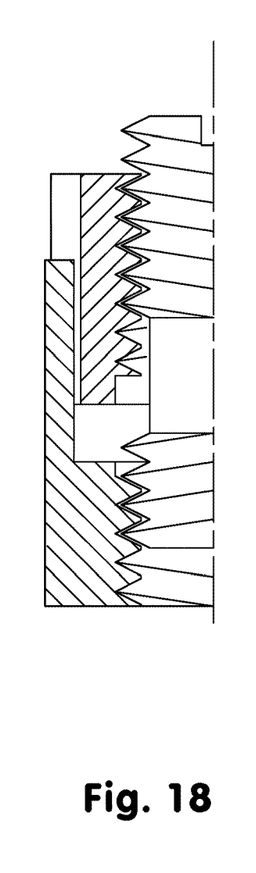
FIG. 18: Same as FIG. 17, but the threaded bolt equivalent has been screwed in by one additional turn.
Figure 19:
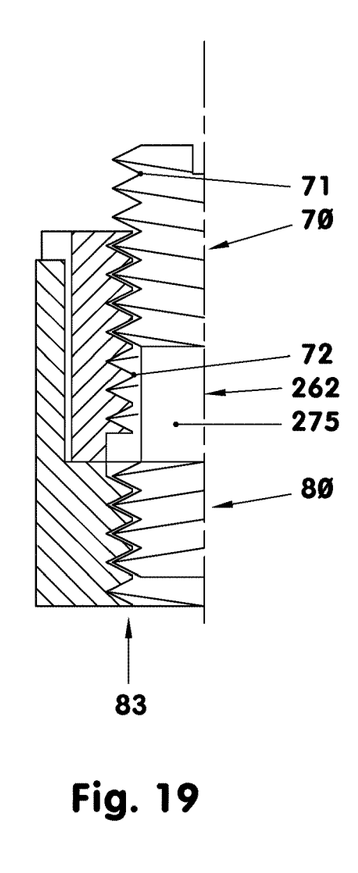
FIG. 19: Same as FIG. 18, but the threaded bolt equivalent has been screwed in by one last turn.

In FIGS. 18 and 19, the threaded bolt equivalent (262) is screwed in one clockwise turn lower in each case. After the third full turn, the lifting nut stop (222) contacts the fixed nut stop (212). Thereby, the threaded bolt equivalent (262) has three threads in the fixed nut (210) and in the lifting nut (220).

For example, since the pitches and thread diameters of the thread pairings (73, 83) each match here, each thread pairing (73, 83) has the same or nearly the same number of supporting threads.

In the exemplary embodiment according to FIGS. 9-11, a threaded bolt (62) that uses an M 1.8×0.2 LH thread as the outer thread for driving (71) is used. The outer thread for clamping (81) is an M 1.6×0.35 standard thread. The intermediate region (75) between the two threads is a cylinder journal (76), the diameter of which corresponds to the core diameter of the outer thread for clamping (81). The diameter can also be increased to the head diameter of the outer thread for driving (71). The gripping section (85) has the shape of a cylinder according to FIG. 9.

FIG. 10 shows the superstructure support (22) together with the threaded bolt (62) upon the insertion into the implant body (10). In the upper part of the cavity (51) of the superstructure support (22), a stop bolt (48) made of plastic is inserted in a force-fitting manner only by way of example, which limits the screw-in stroke of the threaded bolt (62) when it is screwed into the counterclockwise outer thread for driving (71). The stop bolt (48) is removed prior to the insertion of the superstructure support (22) into the implanted implant body (10), in order to make room for the tool.

FIG. 11 shows the completed assembly interface after screwing the threaded bolt (62) clockwise into the clockwise inner thread for clamping (82) of the implant body (10).

All threads shown in the exemplary embodiments are metric threads according to DIN 13. Instead of metric threads, trapezoidal threads, flat threads, saw threads, round or milk threads, pipe threads, Whitworth threads, UNF/UNC threads or the like can also be used. All threaded bolts (60-62) are made of TiAL6V4 or TiAl6V4 ELI, for example.

In the exemplary embodiment, an adhesive body (100) is bonded or cemented onto the superstructure support (20), see FIG. 2. The adhesive body (100) is a hollow body that is arranged within the dental prosthesis between the superstructure support (20) and the artificial tooth crown (120). With its help, among other things, the angular position of the tooth crown (120) is adjusted to the angular position of the implant post (23).

The adhesive body (100) has an essentially pot-shaped configuration. Its inner wall (105) is matched to the outer wall (26) of the implant post (23), including the upper edge surface (37). The clearance is, for example, 30 to 50 μm, such that the adhesive body (100) rests on the implant post (23) of the superstructure support (20) over a large area with the interposition of an adhesive (113).

The adhesive body (100) has a lower edge, with which it is supported on the upper edge surface (37) of the superstructure support (20). In the region of its upper side (102), it has a cavity (106) that, when the prosthesis is mounted, is an extension of the upper part of the cavity (51) of the implant post (23).

According to the exemplary embodiment in accordance with FIG. 1, the tooth crown (120) is seated here on an adhesive body (100). Accordingly, the inner wall of the tooth crown (120) is adapted to the outer wall (101) of the adhesive body (100). Here as well, the clearance between the outer wall (101) and inner wall of the tooth crown (120) is, for example, 30 to 50 μm.

According to FIG. 2, with the finished prosthesis, the superstructure support (20) is seated in the conical seat (14) of the implant body (10) by means of an implant cone (43) in a manner secured against rotation and screwed. The implant neck (42) and the lower side of the implant plate (31) rest against the gums.

LIST OF REFERENCE SIGNS

1 Denture, prosthetic
5 Pre-assembly direction for (60-62)
10 Implant body
11 Outer thread
12 Implant shoulder
13 Cavity, stepped
14 Inner cone, first zone, cone, cone seat
15 Inner hexagon, second zone, coupling geometry
17 Threaded bore, third zone for (82)
19 Center line
20 Superstructure support for threaded bolt (60)
21 Superstructure support for threaded bolt (61)
22 Superstructure support for threaded bolt (62)
23 Implant post
26 Outer surface, radial; Outer wall
29 Center line
31 Implant plate
33 Edge
35 Groove
37 Upper edge surface, flat
42 Implant neck
43 Implant cone, outer cone
44 Anti-rotation device, outer hexagon, coupling geometry
48 Stop bolt
49 Center line
51 Cavity, kinked
52 First, lower zone, lower cavity
53 Second zone, lower cavity
54 Stop collar
55 Constriction, stop zone
56 Third zone, hemispherical shell surface
57 Fourth, upper zone; bore, cylindrical
58 Rear grip bore
59 Center line of (56, 57)
60 Threaded bolt with stop flange
61 Threaded bolt, short
62 Bolts with opposing threads
63 Articulation region
64 Journal, cylindrical, cylinder journal
65 Tool cavity
66 Inner hexagon
70 Drive region
71 Outer thread for driving, outer thread, drive thread, left-side thread in FIGS. 9-11 and 16-19
72 Inner thread for driving, inner thread, drive thread, left-side thread in FIGS. 9-11 and 16-19
73 Drive pairing, drive thread, pairing
75 Intermediate region
76 Cylinder journal
77 Truncated cone journal
78 Stop flange, stop zone
80 Clamping region
81 Outer thread for clamping, outer thread, clamping thread
82 Inner thread for clamping, inner thread, clamping thread
83 Clamping pairing, clamping thread, pairing
85 Gripping region, gripping means
100 Adhesive body, part of a hybrid abutment, superstructure 101 Outer wall, outer surface
102 Upper side
105 Inner wall, inner surface
106 Cavity
113 Adhesive
120 Dental crown, artificial, superstructure
210 Fixed nut
212 Fixed nut stop
215 Anti-rotation bar
220 Lifting nut
222 Lifting nut stop
225 Anti-rotation groove
260 Threaded bolt equivalent with two thread pitches
262 Threaded bolt equivalent with left-side and right-side thread
267 Slot, tool cavity
275 Shaft
LE Length unit

The invention claimed is:

1. An assembly, comprising:
a superstructure support (20-22) that supports a superstructure (100, 120);
an implant body (10) having an inner clamping thread (82); and
a threaded bolt (60-62),
wherein the superstructure support (20-22) and the implant body (10) have a coupling geometry (15, 44) that is complementary at least in certain regions in order to ensure rotational stability of the assembly,
wherein the superstructure support (20-22) has a cavity (51) open towards the superstructure (100, 120) and towards the implant body (10),
wherein the cavity (51) extends through the superstructure support (20-22) and includes a kink in a central region thereof,
wherein an inner drive thread (72) is arranged in the cavity (51) in a region facing the implant body (10),
wherein the threaded bolt (60-62) has two outer threads (71, 81) arranged one behind the other, a first of the two outer threads (71, 81) being an outer drive thread (71) and a second of the two outer threads (71, 81) being an outer clamping thread (81),
wherein the threaded bolt (60-62) includes an intermediate region (75) between the two outer threads (71, 81),
wherein the two outer threads (71, 81) have different pitches,
wherein the outer drive thread (71) meshes with the inner drive thread (72) of the cavity (51) of the superstructure support (20-22) and the outer clamping thread (81) meshes with the inner clamping thread (82) of the implant body (10), and
wherein the intermediate region (75) is composed of a cylinder journal (76) and a stop flange (78),
wherein a stop collar (54) is formed in the cavity (51) between the inner drive thread (72) and a bore (52) at an end of the cavity towards the implant body (10), and
wherein, before the superstructure support (21) is attached to the implant body (10), threaded bolt (60) is screwed into the inner drive thread until the stop flange (78) of the threaded bolt (60) rests against the stop collar (54), and
wherein, when the superstructure support (21) is attached to the implant body (10), the stop flange (78) does not rest against the stop collar (54).

2. The assembly according to claim 1,
wherein the two drive threads (71, 72) form a drive pairing (73) and the two clamping threads (81, 82) form a clamping pairing (83),
wherein the threads of the two pairings (73, 83) have different pitches with the same pitch sign.

3. The assembly according to claim 2,
wherein the threads (71, 72) of the drive pairing (73) have the same pitch sign and a smaller pitch than the threads (81, 82) of the clamping pairing (83).

4. The assembly according to claim 2,
wherein the threads (71, 72, 81, 82) of both pairings (73, 83) have different pitch signs.

5. The assembly according to claim 2,
wherein the threads (71, 72) of the drive pairing (73) each have a negative pitch signs, that is, they are left-rising threads (71, 72).

6. The assembly according to claim 2,
wherein the threads of the pairings (73, 83) have different thread diameters.

7. The assembly according to claim 1,
wherein the threaded bolt (60-62) has a tool cavity (65) at at least one end.

8. The assembly according to claim 1,
wherein the threaded bolt (60-62) has a gripping region (85) at its front end, and
wherein the gripping region (85) is shaped as an outer hexagon tapered towards a free end of the threaded bolt (60), as a cylindrical journal, or as a cone that tapers towards a free end.

* * * * *